United States Patent
Song et al.

(10) Patent No.: US 9,552,326 B2
(45) Date of Patent: Jan. 24, 2017

(54) CACHE SYSTEM AND CACHE SERVICE PROVIDING METHOD USING NETWORK SWITCH

(71) Applicant: NHN Corporation, Seongnam-si (KR)

(72) Inventors: Chang-Hyeon Song, Seongnam-si (KR); Hoonmin Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 288 days.

(21) Appl. No.: 13/795,851

(22) Filed: Mar. 12, 2013

(65) Prior Publication Data
US 2013/0254325 A1 Sep. 26, 2013

(30) Foreign Application Priority Data
Mar. 21, 2012 (KR) .................. 10-2012-0028949

(51) Int. Cl.
*G06F 15/167* (2006.01)
*G06F 17/30* (2006.01)

(52) U.S. Cl.
CPC ......... *G06F 15/167* (2013.01); *G06F 17/3048* (2013.01)

(58) Field of Classification Search
CPC .................................................. G06F 15/167
USPC ........................................................ 709/213
See application file for complete search history.

(56) References Cited

U.S. PATENT DOCUMENTS

| | | | |
|---|---|---|---|
| 5,987,506 A * | 11/1999 | Carter et al. ............... | 709/213 |
| 6,457,047 B1 * | 9/2002 | Chandra et al. .............. | 709/217 |
| 6,850,980 B1 * | 2/2005 | Gourlay ....................... | 709/226 |
| 7,599,997 B1 * | 10/2009 | Fein et al. .................... | 709/212 |
| 2001/0049773 A1 | 12/2001 | Bhavsar | |
| 2010/0146213 A1 * | 6/2010 | Yao et al. ...................... | 711/136 |
| 2011/0087833 A1 | 4/2011 | Jones | |
| 2011/0153770 A1 * | 6/2011 | Antani ............. | G06F 17/30457 709/208 |
| 2012/0110113 A1 * | 5/2012 | Lee et al. ..................... | 709/214 |
| 2012/0271964 A1 * | 10/2012 | Porter ................ | H04L 67/1008 709/235 |

FOREIGN PATENT DOCUMENTS

KR   10-2010-0118836   11/2010

OTHER PUBLICATIONS

Blue Coat Systems, CacheFlow Appliance Series Datasheet, 2016 (3 pages).*
Zhang et al., "SmartSwitch: Blurring the Line Between Network Infrastructure & Cloud Applications", 2014, USENIX (6 pages).*
Wessels, Web Caching, Jun. 2001, O'Reilly, Chapter 5 (20 pages).*

* cited by examiner

*Primary Examiner* — Brendan Higa
*Assistant Examiner* — Leon Y Tseng
(74) *Attorney, Agent, or Firm* — Harness, Dickey & Pierce, P.L.C.

(57) ABSTRACT

A cache system configured to provide a cache service includes a network switch and a cache device. The network switch is configured to route data associated with a plurality of servers. The cache device is disposed in association with the network switch. The cache device is configured to cache, in at least one memory available to the network switch, data published by the plurality of servers via the network switch. The cache device is also configured to transmit at least some of the cached data in response to a request received from at least one of the plurality of servers. The network switch provides the cache service via the cache device.

13 Claims, 4 Drawing Sheets

CACHE SYSTEM AND CACHE SERVICE PROVIDING METHOD USING NETWORK SWITCH

CROSS-REFERENCE TO RELATED APPLICATION

This application claims priority from and the benefit of Korean Patent Application No. 10-2012-0028949, filed on Mar. 21, 2012, which is hereby incorporated by reference for all purposes as if fully set forth herein.

BACKGROUND

Field

Exemplary embodiments relate to a cache system and a cache service providing method using network switches.

Discussion

Conventional cache servers are high-speed storage devices configured to store data frequently referenced by users of an associated service. Typically, the frequently referenced data is stored for a limited (or otherwise predetermined) duration of time. Further, conventional cache servers may be established to provide a relatively faster response time (or speed) for a service utilizing one or more cache techniques by assisting a relatively slower main storage device, such as a relational database management system (RDMS). For instance, a web cache server may be configured to temporarily store web documents (e.g., webpages, images, etc.) to reduce bandwidth usage, server load, and perceived lag in association with one or more main servers configured to provide the web resource associated with the web documents. In this manner, conventional cache servers typically store copies of frequently accessed data when such data passes through the cache server onto its intended destination. As such, subsequent requests for the cached data may be provided by the cache server instead of being forwarded to and responded by a main server.

In order to cache data, cache servers may be disposed in an internet data center (IDC) in numbers equal to or greater than a number of servers providing a service such as, for example, a web server, a web application server, an application server, and the like. In this manner, the IDC may be configured to execute one or more processes for providing a cache service, and thereby, enable the cache servers to be accessed by users. As such, additional management servers may be required when a fault-tolerant cache service is to be provided to ensure reliable access to the cached data.

By way of example, Korean Patent Laid-Open Gazette No. 10-2010-0118836, published on Nov. 8, 2010, and entitled "SYSTEM FOR AVOIDING A DISTRIBUTED DENIAL OF SERVICE ATTACK, A LOAD DISTRIBUTING SYSTEM, AND A CACHE SERVER, CAPABLE OF REDUCING CIRCUIT COSTS" sets forth a method for distributing traffic to a plurality of cache servers. However, when an established cache server exceeds a predetermined degree of resource exhaustion due to, for instance, an increase in use of an associated cache service, an issue may arise in terms of a cost to manage the cache server being higher than a cost to manage an associated main storage. In general, the cost to manage the main storage may include an IDC rack cost (e.g., a rack space cost), power costs to maintain suitable environmental conditions (e.g., constant temperature, humidity, etc. conditions), and the like. Also, an issue of a central processing unit (CPU) of a cache server being utilized inefficiently may exist due to a characteristic of a cache service using only a common memory.

Therefore, there is a need for an approach that conveniently and efficiently provides cache services within cost-effective network architectures.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a cache system and a cache service providing method using network switches to reduce management costs associated with providing managing additional cache servers. In exemplary embodiments, the cache system and cache service providing method enable new and/or preexisting network switches that are (or are to be) disposed, for example, to concentrate servers to be configured to provide cache services in association with available resources of the network switches. As such, exemplary embodiments enable network switch resources to be more efficiently utilized.

Additional aspects will be set forth in the detailed description which follows, and in part, will be apparent from the disclosure, or may be learned by practice of the invention.

According to exemplary embodiments, a cache device disposed in association with a network switch configured to route data associated with a plurality of servers, includes: at least one memory including computer code that when executed by one or more processors cause the cache device at least to: receive data being routed by the network switch in association with one of the plurality of servers, and determine to cache data based on a cache service information associated with the one server, wherein data is cached in at least one memory available to the network switch.

According to exemplary embodiments, a cache system configured to provide a cache service, includes: a network switch configured to route data associated with a plurality of servers; and a cache device disposed in association with the network switch, the cache device being configured to: cache, in at least one memory available to the network switch, data published by the plurality of servers via the network switch, transmit at least some of the cached data in response to a request received from at least one of the plurality of servers. The network switch provides the cache service via the cache device.

According to exemplary embodiments, a non-transitory computer-readable storage medium configured to store at least one program including instructions that when executed by a network switch configured to route data associated with a plurality of servers, are configured to cause the network switch at least to: receive data being routed by network switch in association with one of the plurality of servers; and determine whether to cache the data based on a cache service information associated with the one server. The data is cached in at least one memory available to the network switch.

According to exemplary embodiments, a method to provide a cache service via a network switch configured to route data associated with a plurality of servers, includes: receiving data being routed by the network switch in association with one of the plurality of servers; and determining to cache the data based on a cache service information associated with the one server. The data is cached in at least one memory available to the network switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
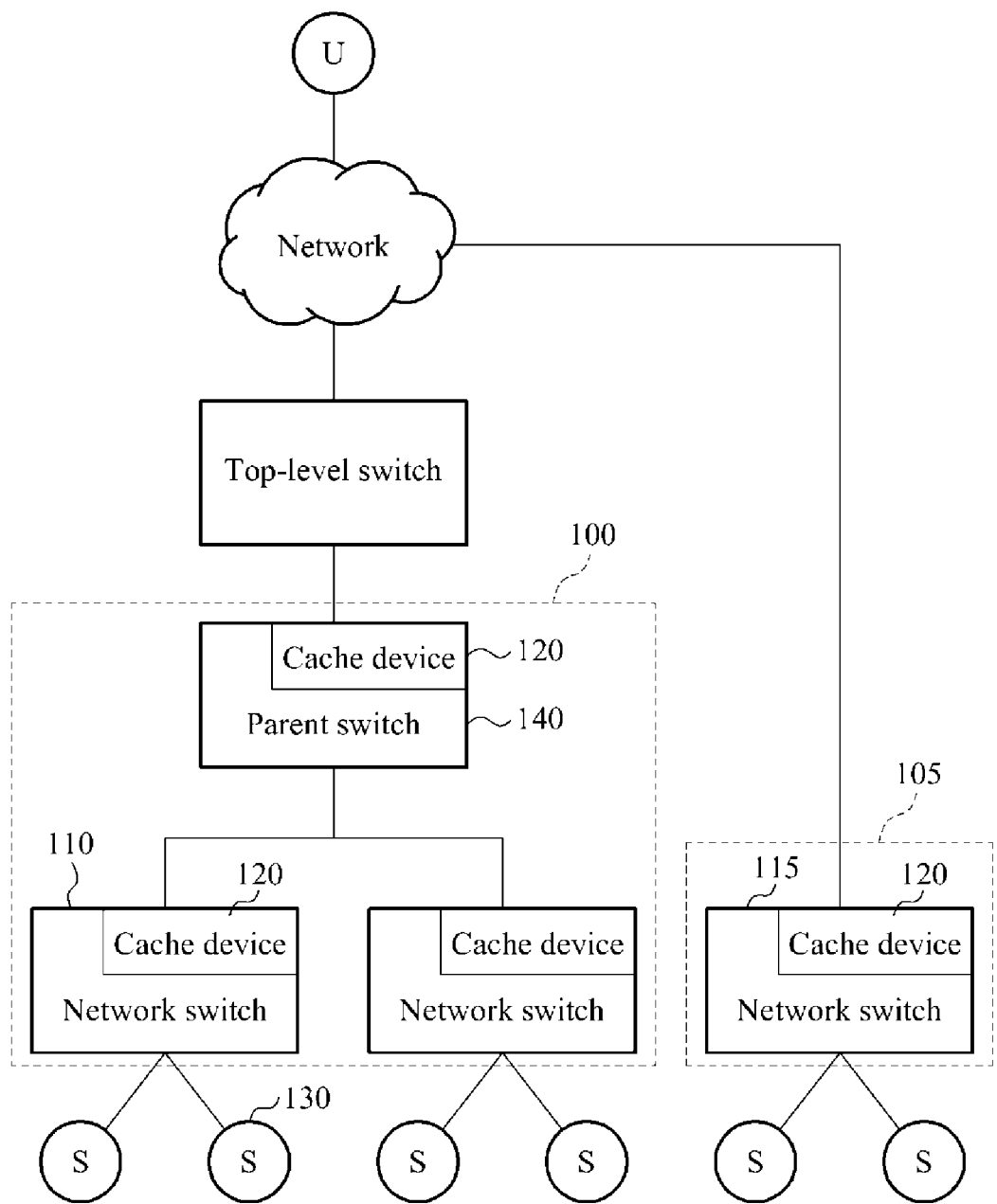
FIG. 1 is a diagram of a cache system using network switches to cache data, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, like reference numerals denote like elements.

When an element is referred to as being "connected to" another element, it may be directly connected to the other element, or intervening elements may be present. When, however, an element is referred to as being "directly connected to" another element, there are no intervening elements present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, etc., these elements, components, etc., should not be limited by these terms. These terms are only used to distinguish one element, component, etc., from another element, component, etc. Thus, a first element, component, etc., that is discussed below may be termed a second element, component, etc., without departing from the teachings of the present invention.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram of a cache system using network switches to cache data, according to exemplary embodiments. As used herein, "U" denotes a user terminal, and "S" denotes a server configured to provide at least one networked service, such as a web server configured to provide a web service, a web application server configured to facilitate access to at least one networked application, and the like.

According to exemplary embodiments, the cache system 100 may be configured to provide cache services that utilize available resources of a network switch and/or a cluster network switches without the provisioning of one or more conventional cache servers. To this end, the cache system 100 may include a plurality of network switches 110 that may be configured to concentrate a plurality of servers 130, and a cache device 120 disposed in each of the plurality of network switches 110. While specific reference will be made hereto, it is contemplated that the illustrated networking environment, as well as system 100 may embody many forms and include multiple and/or alternative components and facilities.

In exemplary embodiments, the cache device 120 may be configured to cache data published (or otherwise distributed) by the plurality of servers 130 in a cache memory (not shown) of the network switch and transmit the cached data in response to a request received from the plurality of servers 130 or at least one user terminal U. For instance, the cache device 120 may be configured to cache (i.e., store) data received from one or more servers 130 and intended for distribution to one or more user terminals U or other destination. According to exemplary embodiments, storage of the data to be cached may be performed based on a cache service policy associated with a server 130 corresponding to the data to be cached. For instance, the cache service policy may be utilized by cache device 120 to determine if data associated with a server 130 is to be cached, e.g., if the server 130 subscribes to a cache service provided via cache device 120, as well as utilized to determine when existing cached data is to be overwritten (or otherwise discarded), such as to make space available for other, more frequently utilized cache data. For instance, cache service information stored to the cache service policy may indicate a time-to-expire for cached data, a threshold frequency of use that is to be achieved before data is cached, and/or the like. To this end, the cache device 120 may be configured to monitor available resources (e.g., available memory, bandwidth, processing power, etc.) of an associated network switch 110 to determine how much of and where to store received data as cached data.

Referring to FIG. 1, the cache systems 100 and 105 may enable network switches 110, 115 and a parent switch 140 to provide a cache service via the associated cache devices 120 installed in (or otherwise associated with) the network switches 110 and the parent switch 140 and/or installed in (or otherwise associated with) the network switch 115. To this end, one or more of the cache devices 120 may be configured to monitor available resources of one or more other network switches 110 so that if not enough resources are available at one network switch 110, then the data may be transmitted to another network switch 110 with available resources to store the data to be cached. In this manner, a number of network switches 110 may be configured to operate as a cache cluster by clustering, for example, adjacent network switches 110, such as illustrated in association with cache system 100. To this end, overall monitoring and management functions of available resources to a cache cluster may be governed by a cache device 120 disposed in association with a parent switch 140 of one or more subordinate network switches 110 in the cache cluster. It is also contemplated that cache systems 100, 105 may be configured to communicate with one another to further cluster resources or otherwise provide one or more features associated with the cache services. It is also noted that the monitoring and management functions maybe distributed to one or more network switches 110 including cache devices 120. As such, at least some of the cache devices 120 may be configured to monitor available resources of associated network switches 110 and report such resource availability to one or more other cache devices 120 to facilitate determinations regarding the caching of data.

According to exemplary embodiments, the cache device 120 may be installed in the network switches 110, 115 and/or the parent switch 140 in the form of software and/or provided in the form of hardware via one or more cards or boards configured to be installed in (or associated with) the corresponding network switch 110, 115 and/or parent switch 140. For instance, a peripheral card or board including one or more components defining cache device 120 may be installed as hardware in a corresponding network switch 110, 115, 140 via one or more expansion slots provided via a mainboard of the corresponding network switch 110, 115, 140, such as connected via one or more peripheral component interconnect (PCI) slots, one or more multi-wire planar cables, and/or the like. As such, the processes described herein for providing the cache services via cache devices 120 may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

As an example, when a cache device 120 is installed in a network switch 110 in the form of software, the cache device 120 may include one or more instructions that, when executed by one or more processors, are configured to control a cache service provided via the network switch 110 and/or one or more other network switches 110. The one or more instructions may be configured to control the network switch 110 to cache data published by one or more of servers 130 in at least one memory (e.g., cache memory) of the network switches 110, 115 and the parent switch 140, and to transmit the cached data in response to receiving a request for the cached data, whether the request is received from at least one server 130 and/or at least one user terminal U. According to exemplary embodiments, the request for cache data may be received from another network switch 110, such as, in association with, the redistribution of cache data among a cluster of network switches 110 operating as a cache cluster. In other words, the request for cache data may be utilized to redistribute cache data to other network switches 110 with more available network resources and/or to redistribute cache data for redundancy purposes. The request for cache data may also be utilized to provision cache services in another geographical location, such that the cached data may be provided to one or more other network switches 110 without burdening the one or more service providing servers 130 with requests for such data.

In exemplary embodiments, a cache device 120 may be provisioned in the form of a software module configured to be stored in at least one storage medium of or available to an associated network switch 110, 115 or parent switch 140. The storage medium may take many forms, including, but not limited to, non-volatile media, and/or volatile media. Non-volatile media may include, for example, optical or magnetic disks and other persistent memory. Volatile media may include, for example, dynamic random access memory (DRAM), which is typically utilized in association with "main" memories of a network switch. Other forms of storage media may include, for example, a floppy disk, flexible disk, hard disk, magnetic tape, any other magnetic medium, a CD-ROM, DVD, any other optical medium, a random access memory (RAM), a programmable read-only memory (PROM), an erasable programmable read-only memory (EPROM), a flash electrically erasable programmable read-only memory (FLASH-EEPROM), any other memory chip or cartridge, or any other tangible medium from which at least one processor can read information/instructions. In this manner, the at least one storage medium may be local to the network switch 110, 115, 140 or may be an external storage medium separately connected and made available to the network switch 110, 115, 140.

It is also contemplated that cache devices 120 may be provided in the form of a hardware module, a firmware module, or a combination of software, hardware, and/or firmware module. In this manner, the cache device 120 may include at least one control unit (not shown) implemented as one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the at least one memory (e.g., cache memory) in which the data is to be stored as cached data may be a portion of unused, existing memory of the network switch 110, 115, 140 and/or unused, extended memory additionally provided to the network switch 110, 115, 140 via a memory slot or other connection to the network switch 110, 115, 140, and the like. In this manner, the unused resources of network switches 110, 115, 140 may be more efficiently utilized. Furthermore, the resources of network switches 110, 115, 140 may be augmented.

In exemplary embodiments, the cache device 120 may be configured to transmit appropriate data in response to a request being received from the plurality of servers 130 for a service, and be used as a web cache, an application object cache, an event publishing-subscribing (pub-sub) storage, a session storage, and the like.

Accordingly, such a structure of the cache system 100 may be attributed to reducing an internet data center (IDC) management cost by enabling cache services without having to provision an additional server to provide such cache services. Furthermore, costs may be minimized through the utilization of idle resources of the network switches 110, 115, 140.

As an example, the cache device 120 may cache data published by at least one of the plurality of servers 130 in available memory (e.g., cache memory) of a corresponding network switch using an idle resource of the network switches 110, 115, 140. As such, the data published by the at least one of the plurality of servers 130 may be stored as cache data that is distributed in one or more memories (e.g., cache memories) of a plurality of network switches 110, 115, 140 based on the idle resource of the network switches 110, 115, 140. As previously mentioned, one or more of the cache devices 120 may be configured to monitor available resources of associated network switches 110, 115, 140 so as to enable the distribution of cache data among the network switches 110, 115, 140.

According to exemplary embodiments, the cache system 100 may be implemented in the form of a cloud service that combines infrastructure as a service (IaaS) and platform as a service (PaaS) by providing a highly efficient data cache service through utilization of a network switch infrastructure.

Figure 2:
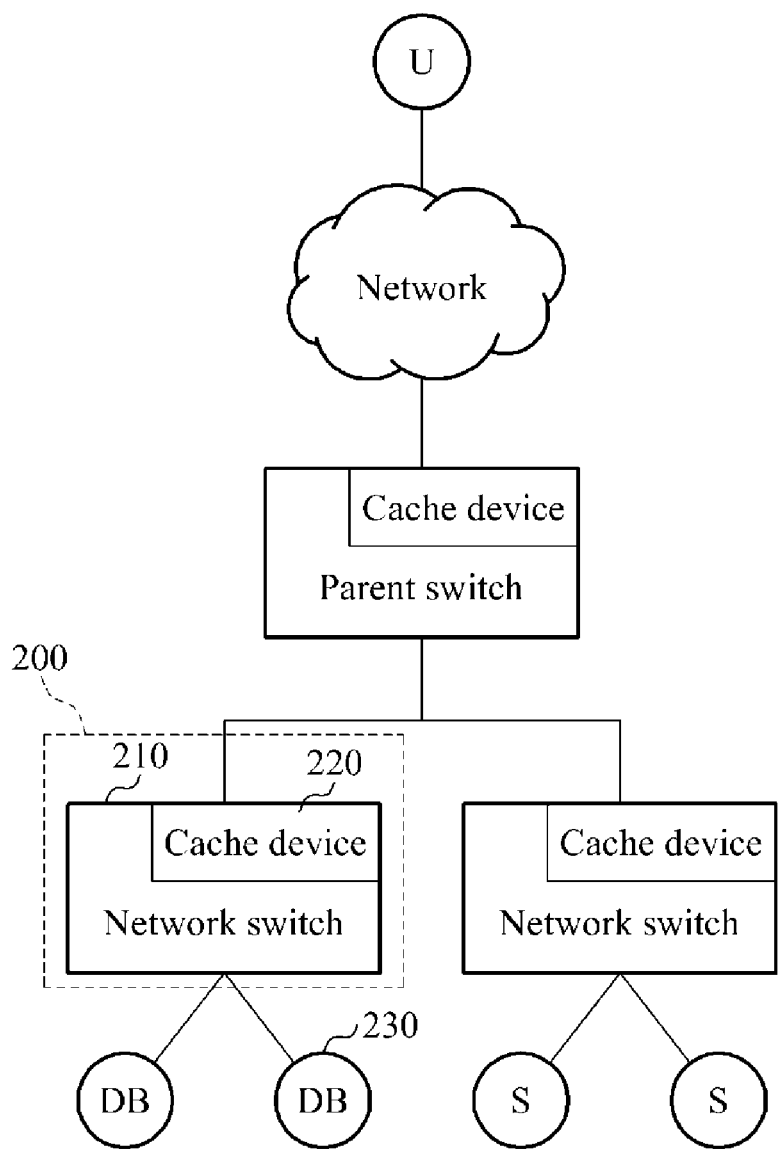
FIG. 2 is a diagram of a cache system using network switches connected to a main storage, according to exemplary embodiments.

FIG. 2 is a diagram of a cache system using network switches connected to a main storage, according to exemplary embodiments. It is noted that cache system 200 may function similarly to cache systems 100 or 105 of FIG. 1, and therefore, to avoid obscuring exemplary embodiments described herein, differences are provided below.

Referring to FIG. 2, the cache system 200 may be configured to provide cache services to a main storage 230, such as a database management system (DBMS), and the like. In this manner, instead of caching data associated with a plurality of servers 130, cache system 200 may be utilized to facilitate quicker, more efficient access to frequency retrieved data stored in association with one or more databases 230.

According to exemplary embodiments, the cache system 200 may be configured to provide the cache services to main storage 230 based on available resources of network switch 210, which may be monitored by cache device 220. Cache device 220 may be further configured to store data to be cached based on a cache service policy associated with one or more of the main storage devices 230. Accordingly, since an additional cache server does not need to be provisioned to provide the cache services, a cache server establishing cost, an IDC management cost, and the like, may be reduced. Also, since idle resources of the network switch 210, which may be disposed adjacently to the main storage 230 or a server configured to access main storage 230, is utilized to cache data locally to the network switch 210, usage of overall network bandwidth may be reduced because the cached data is able to be fetched without having to pass through a top-level switch.

Figure 3:
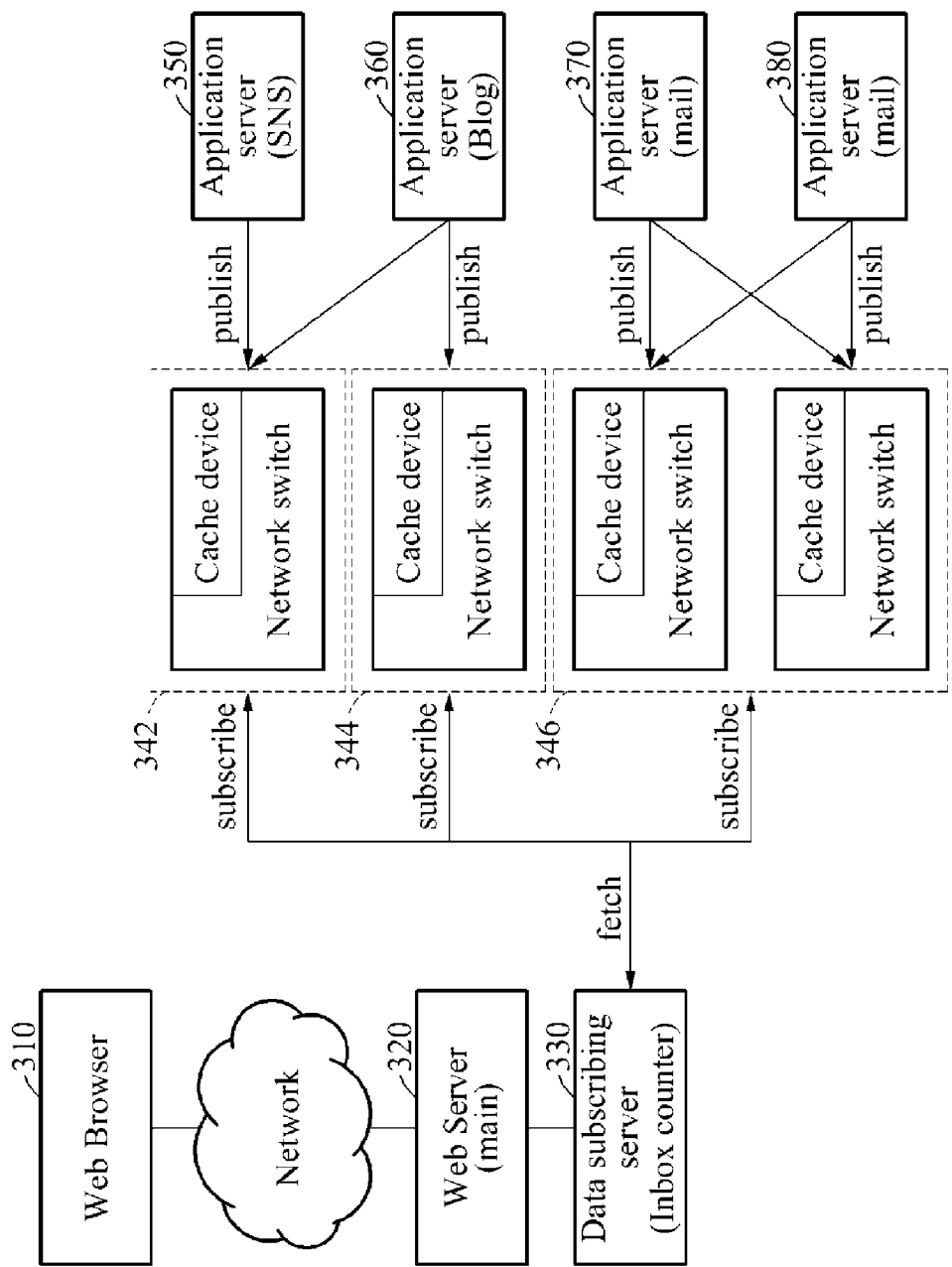
FIG. 3 is a diagram of a process to provide a publishing-subscribing service via a cache system using network switches, according to exemplary embodiments.

FIG. 3 is a diagram of a process to provide a publishing-subscribing service via a cache system using network switches, according to exemplary embodiments.

According to exemplary embodiments, when a user logs onto a main page of, for instance, a web site via a network using a web browser 310 of a user terminal, a main service may provide most recent information in the form of a "My Page" by integrating data associated with a plurality of subordinate services to the main service. For instance, the "My Page" may integrate a number of e-mails newly received in association with a subordinate mail service of the user, a number of posts newly posted in association with a subordinate blog service, a number of posts uploaded on a subordinate social networking service (SNS) account, and/or the like. Hereinafter, a process to provide information associated with a subordinate service to the main service via subscribing to cache information published through a cache system using one or more network switches will be described.

A main web server 320 may request a data subscribing server 330 for information about a number of subordinate services, such as an electronic mail (e-mail) service, a blog service, a SNS service, and the like. In this manner, the request may specifically request the data subscribing server 330 to provide new e-mails, a number of new blog posts, a number of new SNS posts, and/or the like, or the request may be a general query to the data subscribing server 330 to return any new information associated with a user requesting such information from the web server 320.

According to exemplary embodiments, the data subscribing server 330 may subscribe to data published in a cache memory of one or more network switches by application servers 350-380. In this manner, the network switches may be configured to provide cache services to the application servers 350-380. It is noted that the information cached in the network switches may be processed or unprocessed. As such, the data subscribing server 330 may be configured to retrieve, in response to receiving a request from the main web server 320, at least some of the data cached in the plurality of network switches.

In exemplary embodiments, a cache device 120 may be disposed in association with each of the network switches for concentrating application servers 350-380, and thereby, for providing a plurality of services. In exemplary embodiments, the network switches concentrate data of a plurality of the application servers 350-380 as cached data based on cache service information retrieved from a cache service policy associated with one or more of the application servers 350-380 or a request received from one or more of the application servers 350-380. To this end, the cache devices 120 may be configured to operate as one or more cache systems (e.g., cache systems 342, 344, and 346) associated with a pub-sub service.

The application servers 350-380, which are configured to provide a plurality of subordinate services, may publish data associated with the plurality of subordinate services in a cache memory of the cache systems 342, 344, and 346 to which the application servers 350-380 belong, respectively. It is noted that the plurality of subordinate services are considered subordinate to a main service provided via web server 320. The application servers 350-380 may publish data belonging to the application servers 350-380 in a cache system to which the application servers 350-380 do not belong based on one or more idle resources of the network switches. As previously described, the cache devices 120 may be configured to monitor idle (or available) resources of the network switches to enable application servers 350-380 to publish data to cache systems to which they do not belong. For instance, FIG. 3 illustrates an example in which the application server 360, which is configured to provide a blog service, publishes data belonging to the application server 360 in the cache system 342 to which the application server 360 does not belong, as well as publishes data belonging to the application server 360 in cache system 344 to which the application server 360 does belong. As such, cache devices 120 may determine to cache data based on a request received from at least one of the plurality of application servers 350-380.

Accordingly, when for example, a reply is posted on a blog post associated with a user, the data subscribing server 330 may receive a request for subscription from the web server 320 of the main service. The data subscribing server 330 may fetch requested information from information published by the application servers 350-380 in a cache memory of one or more of the network switches when a predetermined event occurs or based on a schedule. In this manner, the data subscribing sever 330 may transmit the fetched information to the web server 320 of the main service requesting the subscription. In exemplary embodiments, the data subscribing server 330 may process fetched information when necessary.

According to exemplary embodiments, the application servers 350-380 may search for data from another cache system when necessary during a process of preparing data to be published, and subsequently process the data found as data belonging to a corresponding application server.

When the data subscribing server 330 is not configured separately, i.e., is a part or feature of the web server 320 of the main service, the web server 320 of the main service may subscribe to the published information cached by the network switches directly.

Figure 4:
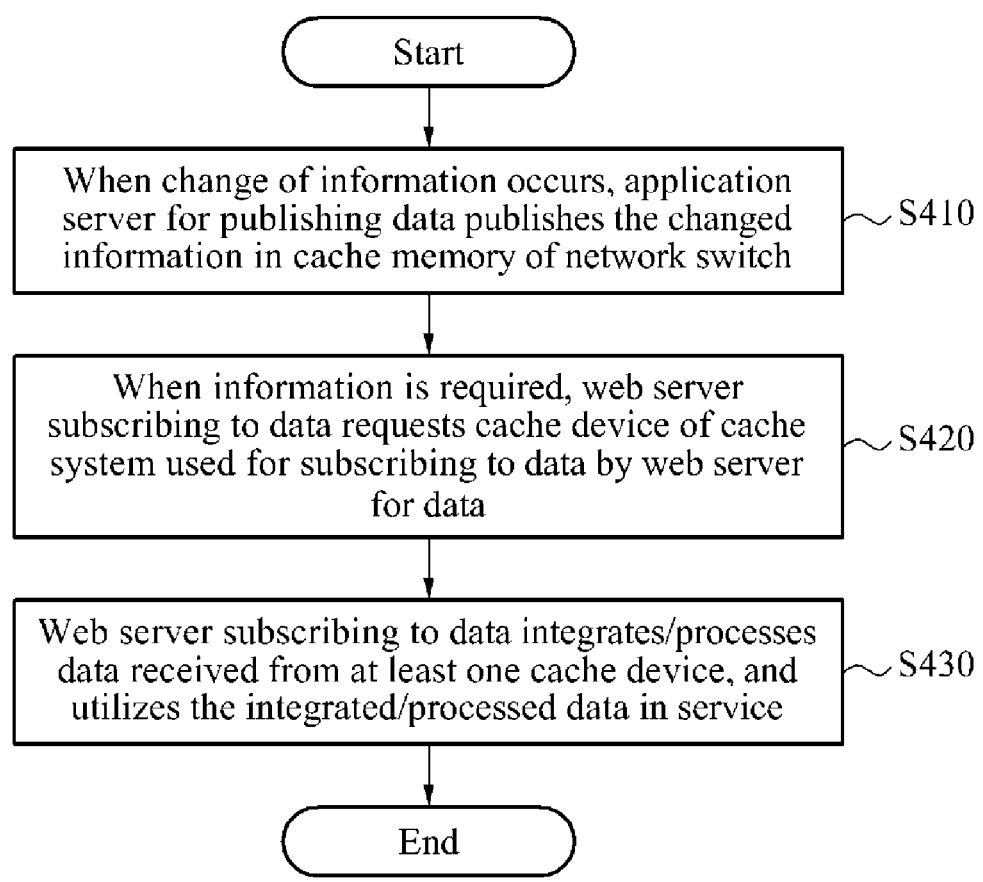
FIG. 4 is a flowchart of a process to provide cache services via network switches, according to exemplary embodiments.

FIG. 4 is a flowchart of a process to provide cache services via network switches, according to exemplary embodiments. For illustrative purposes, the process is described with respect to FIGS. 1 and 3. It is noted that the steps of the process may be performed in any suitable order, as well as combined or separated in any suitable manner.

In operation S410, when a change of information occurs, an application server 350 configured to publish data may publish changed information in a cache memory disposed in association with a plurality of network switches (e.g., network switches 110) configured to concentrate data associated with the services of a plurality of application servers, e.g., application servers 350 and 360. In this manner, the plurality of network switches may cache data based on a cache service policy associated with one or more of the plurality of application servers 350-380 or based on information received in association with a request transmitted by an application server to cache data corresponding to the changed information. It is noted that the published information may be cached in a cache memory by a cache device 120 disposed in the plurality of network switches 110.

In operation S420, when information is required, a web server 320 subscribing to data associated with application server 350 may request the cache device 120 of a cache system (e.g., cache system 342) that the web server 320 subscribes to for the data.

The application server 350 may publish data via distributing the data in the cache memory of a plurality of network switches 110 based on idle resources of the plurality of network switches. In this instance, in operation S430, the web server 320 subscribing to the data may integrate/process data received from at least one cache device 120, and utilize the integrated/processed data in association with a main service.

Accordingly, a cache system and a cache service providing method using one or more network switches may reduce costs associated with management of conventional cache servers because the conventional cache servers may be unnecessary and the cache services may be provided via the idle resources of the one or more network switches.

According to exemplary embodiments, it is possible to reduce usage of overall network bandwidth since cached data may be fetched without passing through a top-level switch due to a network switch adjacent to a service server being utilized as a cache memory. To this end, exemplary embodiments enable management of relatively stable cache services since a failure probability of a network switch is considerably lower than a failure probability of a server.

According to exemplary embodiments, computer-readable media including program instructions configured to implement various operations embodied by a computer may be provided. The media may also include, alone or in combination with the program instructions, data files, data structures, and the like. The media and program instructions may be those specially designed and constructed for the purposes of implementing exemplary embodiments described herein, or they may be of the kind well-known and available to those having ordinary skill in the computer software arts. Examples of computer-readable media include magnetic media, such as hard disks, floppy disks, and magnetic tape; optical media, such as CD ROM discs and DVD; magneto-optical media, such as floptical discs; and hardware devices that are configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A cache device associated with a network switch, the network switch being one of a plurality of network switches arranged as a cache cluster connected to a user terminal via a top-level switch, the plurality of network switches configured to route data associated with a plurality of servers, the cache device comprising:
   at least one memory integrated into the network switch, the at least one memory, storing computer code; and
   one or more processors integrated into the network switch, the one or more processors configured to,
      receive data being routed by the network switch, the data being associated with one of the plurality of servers which is configured to provide a subordinate service among a plurality of subordinate services provided by the plurality of servers,
      first determine whether to cache the data based on cache service information associated with said one of the plurality of servers,
      monitor idle resources available at the network switch, the idle resources including one or more of available memory, bandwidth and processing power,
      second determine whether to cache the data in a cache memory associated with the network switch or in another cache memory associated with another network switch based on the idle resources available at the network switch and the subordinate service, if the cache device determines to cache the data, and
      cache the data based on the first determination and the second determination such that, if the cache device determines to cache the data in the cache memory associated with the network switch, the data is (i) stored using the idle resources available at the network switch without provisioning a cache server to cache the data and (ii) fetchable by ones of the plurality of servers directly connected to the network switch without passing through the top-level switch or the another network switch.

2. The cache device of claim 1, wherein the cache device corresponds to a card or a board configured to be installed in the network switch.

3. A cache system configured to provide a cache service, the cache system comprising:
a network switch, the network switch being one of a plurality of network switches arranged as a cache cluster connected to a user terminal via a top-level switch, the plurality of network switches configured to route data associated with a plurality of servers; and
a cache device associated with the network switch, the cache device including a processor integrated into the network switch, the processor configured to, in response to a request from one of the plurality of servers which is configured to provide a subordinate service among a plurality of subordinate services provided by the plurality of servers,
receive data being routed by the network switch, the data being associated with said one of the plurality of servers,
first determine whether to cache the data based on cache service information associated with said one of the plurality of servers,
monitor idle resources available at the network switch, the idle resources including one or more of available memory, bandwidth and processing power,
second determine whether to cache the data in a cache memory associated with the network switch or in another cache memory associated with another network switch based on the idle resources available at the network switch and the subordinate service, if the cache device determines to cache the data, and
cache the data based on the first determination and the second determination such that, if the cache device determines to cache the data in the cache memory associated with the network switch, the data is is (i) stored using the idle resources available at the network switch without provisioning a cache server to cache the data and (ii) fetchable by ones of the plurality of servers directly connected to the network switch without passing through the top-level switch or the another network.

4. The cache system of claim 3, wherein the cache device corresponds to a card or a board configured to be installed in the network switch.

5. A non-transitory computer-readable storage medium configured to store at least one program comprising instructions that when executed by a network switch that is one of a plurality of network switches arranged as a cache cluster connected to a user terminal via a top-level switch configured to route data associated with a plurality of servers, causes the network switch in response to a request from one of the plurality of servers which is configured to provide a subordinate service among a plurality of subordinate services provided by the plurality of servers at least to:
receive data being routed by the network switch, the data being associated with said one of the plurality of servers;
first determine whether to cache the data based on a cache service information associated with the said one of the plurality of servers;
monitor idle resources available at the network switch, the idle resources including one or more of available memory, bandwidth and processing power;
second determine whether to cache the data in a cache memory associated with the network switch or in another cache memory associated with another network switch based on the idle resources available at the network switch, if the network switch determines to cache the data; and
cache the data in the local memory associated with the network switch based on the first determination and the second determination such that, if the network switch determines to cache the data in the cache memory associated with the network switch, the data is (i) stored using the idle resources available at the network switch without provisioning a cache server to cache the data and (ii) fetchable by ones of the plurality of servers directly connected to the network switch without passing through the top-level switch or the another network switch.

6. A method to provide a cache service via a network switch, the network switch being one of a plurality of network switches arranged as a cache cluster connected to a user terminal via a top-level switch, the plurality of network switches configured to route data associated with a plurality of servers in response to a request from one of the plurality of servers which is configured to provide a subordinate service among a plurality of subordinate services provided by the plurality of servers, the method comprising:
receiving data being routed by the network switch, the data being associated with said one of the plurality of servers; and
first determining whether to cache the data based on a cache service information associated with said one of the plurality of servers;
monitoring idle resources available at the network switch, the idle resources including one or more of available memory, bandwidth and processing power;
second determining whether to cache the data in a cache memory associated with the network switch or in another cache memory associated with another network switch based on the idle resources available at the network switch and the subordinate service, if the network switch determines to cache the data; and
caching the data in the local memory associated with the network switch based on the first determination and the second determination such that, if the second determining determines to cache the data in the cache memory associated with the network switch, the data is (i) stored using the idle resources available at the network switch without provisioning a cache server to cache the data and (ii) fetchable by ones of the plurality of servers directly connected to the network switch without passing through the top-level switch or the another network switch.

7. The cache device of claim 1, wherein the cache service information is retrieved from a cache service policy association with the one server or a request received from the one server to cache the data.

8. The cache device of claim 1, wherein at least some of the data is cached among other ones of the plurality of network switches based on available resources of the plurality of network switches.

9. The cache device of claim 8, wherein the computer code is further configured to, when executed by at least one of the one or more processors, cause the cache device to:
determine available idle resources of the other ones of the plurality of network switches.

10. The cache system of claim 3, wherein at least some of the data is cached among other ones of the plurality of network switches based on the available resources of the other ones of the plurality of network switches.

11. The cache system of claim 10, wherein the cache device is further configured to:
   determine available idle resources of the other ones of the plurality of network switches.

12. The cache system of claim 11, wherein the determination of the available idle resources of the other ones of the plurality of network switches is based on information received from a cache device associated with a parent network switch or at least one cache device associated with at least one of the other ones of the plurality of network switches.

13. The method of claim 6, wherein the cache service information is retrieved from a cache service policy associated with the one server or a request received from the one server to cache the data.

* * * * *